United States Patent
Zhao et al.

(10) Patent No.: US 10,996,325 B2
(45) Date of Patent: May 4, 2021

(54) SYSTEMS AND METHODS FOR ADJUSTING A SIGNAL BROADCAST PATTERN OF AN INTRUSION DETECTOR

(71) Applicant: Ademco Inc., Golden Valley, MN (US)

(72) Inventors: Tianfeng Zhao, Shenzhen (CN); Huayu Li, Shenzhen (CN); Yi Luo, Shenzhen (CN)

(73) Assignee: Ademco Inc., Golden Valley, MN (US)

( * ) Notice: Subject to any disclaimer, the term of this patent is extended or adjusted under 35 U.S.C. 154(b) by 229 days.

(21) Appl. No.: 16/205,807

(22) Filed: Nov. 30, 2018

(65) Prior Publication Data

US 2020/0174111 A1    Jun. 4, 2020

(51) Int. Cl.
*G01S 13/04* (2006.01)
*G01S 7/40* (2006.01)

(52) U.S. Cl.
CPC .............. *G01S 13/04* (2013.01); *G01S 7/40* (2013.01); *G01S 7/4008* (2013.01); *G01S 2007/4013* (2013.01)

(58) Field of Classification Search
CPC combination set(s) only.
See application file for complete search history.

(56) References Cited

U.S. PATENT DOCUMENTS

| | | |
|---|---|---|
| 4,191,953 A | 3/1980 | Woode |
| 4,527,151 A | 7/1985 | Byrne |
| 5,331,308 A | 7/1994 | Buccola et al. |
| 5,781,108 A | 7/1998 | Jacob et al. |
| 6,353,385 B1 | 3/2002 | Molini et al. |
| 6,778,092 B2 | 8/2004 | Braune |
| 6,943,685 B2 | 9/2005 | Seo |
| 6,992,577 B2 | 1/2006 | Tsuji et al. |
| 7,084,761 B2 | 8/2006 | Izumi et al. |
| 7,274,387 B2 | 9/2007 | Gupta et al. |

(Continued)

FOREIGN PATENT DOCUMENTS

| | | |
|---|---|---|
| CA | 2 351 138 A1 | 12/2002 |
| EP | 1 968 024 A1 | 9/2008 |

(Continued)

OTHER PUBLICATIONS

Extended European Search Report from corresponding EP patent application 19211966.7, dated Mar. 11, 2020.

(Continued)

*Primary Examiner* — Mamadou L Diallo
(74) *Attorney, Agent, or Firm* — Fredrikson & Byron, P.A.

(57) ABSTRACT

Systems and methods for adjusting a broadcast pattern of an intrusion detector are provided. Such systems and methods can include a microwave sensor of the intrusion detector broadcasting a detection signal into a secured area in the broadcast pattern, a communication module of the intrusion detector wirelessly receiving a signal adjustment command from a remote device, and a processor and executable control software of the intrusion detector parsing the signal adjustment command and instructing a signal adjuster of the intrusion detector to adjust a sensitivity of the microwave sensor or an amplitude of the detection signal to alter the broadcast area of the broadcast pattern based on information contained in the adjustment command.

20 Claims, 7 Drawing Sheets

(56) References Cited

U.S. PATENT DOCUMENTS

| | | |
|---|---|---|
| 7,327,253 B2 | 2/2008 | Whitten et al. |
| 7,463,182 B1 | 12/2008 | Morinaga et al. |
| 7,636,039 B2 | 12/2009 | Babich |
| 7,679,509 B2 | 3/2010 | Royer |
| 8,102,261 B2 | 1/2012 | Wu |
| 8,432,448 B2 | 4/2013 | Hassapis et al. |
| 8,519,883 B2 | 8/2013 | Drake et al. |
| 9,125,144 B1 | 9/2015 | Orbach et al. |
| 9,189,751 B2 | 11/2015 | Matsuoka et al. |
| 9,237,315 B2 | 1/2016 | Naylor et al. |
| 9,498,885 B2 | 11/2016 | Scott et al. |
| 9,655,217 B2 | 5/2017 | Recker et al. |
| 2002/0175815 A1 | 11/2002 | Baldwin |
| 2003/0030557 A1 | 2/2003 | Progovac et al. |
| 2005/0128067 A1* | 6/2005 | Zakrewski .............. G08B 29/20 340/511 |
| 2006/0139164 A1 | 6/2006 | Tsuji |
| 2007/0018106 A1 | 1/2007 | Zhevelev et al. |
| 2007/0115164 A1 | 5/2007 | Wu et al. |
| 2007/0176765 A1 | 8/2007 | Babich et al. |
| 2007/0252720 A1 | 11/2007 | Hughes et al. |
| 2007/0253461 A1 | 11/2007 | Billington et al. |
| 2008/0100498 A1 | 5/2008 | Fullerton et al. |
| 2008/0218339 A1 | 9/2008 | Royer |
| 2008/0218340 A1 | 9/2008 | Royer |
| 2008/0310254 A1 | 12/2008 | Piel et al. |
| 2009/0051529 A1 | 2/2009 | Tsuji |
| 2010/0013636 A1 | 1/2010 | Wu |
| 2010/0201527 A1 | 8/2010 | Jensen et al. |
| 2010/0201787 A1 | 8/2010 | Zehavi |
| 2013/0300566 A1 | 11/2013 | Kumfer et al. |
| 2015/0212205 A1 | 7/2015 | Shpater |
| 2015/0369618 A1 | 12/2015 | Barnard et al. |
| 2016/0226892 A1 | 8/2016 | Sen et al. |
| 2016/0240056 A1 | 8/2016 | Chen |
| 2017/0103648 A1* | 4/2017 | Bodurka ................. G01S 7/003 |
| 2017/0108885 A1* | 4/2017 | Meganathan ........ G05B 13/041 |
| 2018/0159593 A1* | 6/2018 | Bogdan ............... H04L 12/4625 |
| 2019/0086266 A1 | 3/2019 | Lin et al. |
| 2020/0250945 A1* | 8/2020 | Liiv ................. G08B 13/19669 |

FOREIGN PATENT DOCUMENTS

| | | |
|---|---|---|
| EP | 2 260 563 B1 | 10/2011 |
| EP | 3 355 289 A1 | 8/2018 |
| ES | 1 006 935 U | 1/1989 |
| GB | 2 078 413 A | 1/1982 |
| TW | 201915660 A1 | 4/2019 |

OTHER PUBLICATIONS

English-language translation of TW patent 201915660, dated Apr. 16, 2019.
Extended European search report for related EP patent application 18183507.5, dated Oct. 26, 2018.
Extended European search report for related EP patent application 18153319.1, dated May 8, 2018.
Office action for related CA patent application 2,992,039, dated Sep. 25, 2018.
T.K. Hareendran, HB100 Microwave Motion Sensor—An Introduction, Electro Schematics, © 2017.
United States Nuclear Regulatory Commission, Office of Nuclear Security and Incident Response, Intrusion Detection Systems and Subsystems, Technical Information for NRC Licensees, Published Mar. 2011.
Essential Video Analytics 6.30, @ Bosch Security Systems 2017, V3, Feb. 16, 2017, www.boschsecurity.com.
Stanley—SU 100 Motion Sensor—© 2000.
Rytec Corporation—Motion Detector—Installation and Operating Instructions, Revision: Jan. 21, 2003.
Extended European Search Report for EP patent application 19211968.3, dated Mar. 13, 2020.
English language translation of ES patent publication 1 006 935 U, dated Jan. 16, 1989.

* cited by examiner

SYSTEMS AND METHODS FOR ADJUSTING A SIGNAL BROADCAST PATTERN OF AN INTRUSION DETECTOR

FIELD

The present invention relates generally to security systems employing intrusion detectors. More particularly, the present invention relates to systems and methods for adjusting a signal broadcast pattern of an intrusion detector.

BACKGROUND

Figure 1:
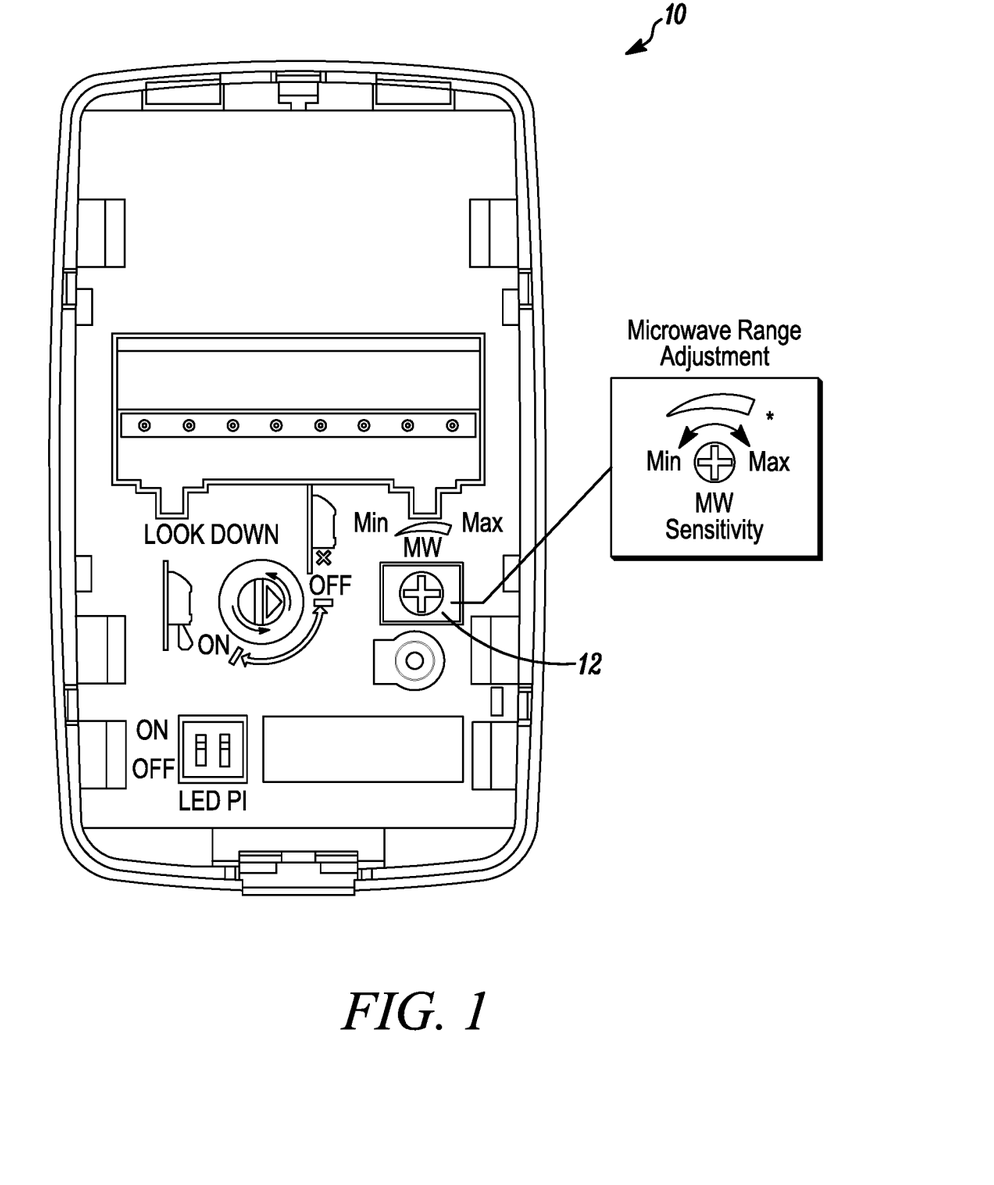
FIG. 1 is a cutaway view of an intrusion detector known in the art.

Known systems and methods for adjusting a signal broadcast pattern of an intrusion detector rely on manual actuation of an internal component. For example, FIG. 1 is a cutaway view of a known intrusion detector 10 including a manually activated signal adjustment mechanism 12. In some known configurations, the manually activated signal adjustment mechanism 12 can include a standard analog potentiometer that varies a circuit gain to adjust the signal broadcast pattern of the intrusion detector 10. However, such manual adjustment mechanisms and methods suffer from several problems. First, manually actuating the signal adjustment mechanism 12 to achieve a desired broadcast pattern can require multiple rounds of adjustment followed by verification of the signal broadcast pattern. Furthermore, intrusion detectors are often deployed in hard to reach locations within a secured area, which makes manual adjustment of the signal broadcast pattern inconsistent and time consuming.

In view of the above, there is a continuing, ongoing need for improved systems and methods.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for adjusting a signal broadcast pattern of an intrusion detector. For example, the intrusion detector as disclosed herein can include a microwave sensor, a signal adjuster electrically coupled to the microwave sensor, a communication module, a processor or main processing unit, and executable control software for the processor or main processing unit. In some embodiments, the signal adjuster can include a digital potentiometer.

In accordance with disclosed embodiments, the microwave sensor can be configured to broadcast a detection signal into a secured area in a broadcast pattern. In some embodiments, the broadcast pattern can be a function of a sensitivity of the microwave sensor (e.g. an amplitude of the detection signal) and/or environmental characteristics of the secured area, such as room size, construction materials, room temperature, and a presence or an absence of electromagnetic interference.

Furthermore, the communication module can be configured to wirelessly receive a signal adjustment command. In some embodiments, the communication module can receive the signal adjustment command from a remote device, such as a mobile device, or a control panel of a security system that includes the intrusion detector. Responsive to the signal adjustment command, the processor or main processing unit and the executable control software can be configured to parse the signal adjustment command and instruct the signal adjuster to adjust the sensitivity of the microwave sensor or the amplitude of the detection signal to alter a broadcast area of the broadcast pattern based on information contained in the adjustment command.

In some embodiments, prior to receiving the signal adjustment command, the processor or main processing unit and the executable control software can be configured to transition the intrusion detector into a settings configuration mode, for example, responsive to user input from the remote device received by the communication module. In such embodiments, after the signal adjuster adjusts the sensitivity of the microwave sensor or the amplitude of the detection signal to alter the broadcast area of the broadcast pattern, the communication module can receive an acknowledgement signal, and the acknowledgement signal can confirm that the broadcast area of the broadcast pattern has been updated as requested by the signal adjustment command. Responsive to receiving the acknowledgment signal, the processor or main processing unit and the executable control software can transition the intrusion detector from the settings configuration mode to a normal operating mode.

In some embodiments, the information contained in the adjustment command can include a desired area for the broadcast pattern. In such embodiments, the processor or main processing unit and the executable control software can instruct the signal adjuster to adjust the sensitivity of the microwave sensor or the amplitude of the detection signal to a level or value that alters the broadcast area of the broadcast pattern to match the desired area for the broadcast pattern. In some embodiments, the signal adjuster can increase the sensitivity of the microwave sensor or the amplitude of the detection signal to increase the broadcast area of the broadcast pattern and decrease the sensitivity of the microwave sensor or the amplitude of the detection signal to decrease the broadcast area of the broadcast pattern. Additionally or alternatively, in some embodiments, the information contained in the adjustment command can include a desired detection signal level or desired amplitude, and the processor and the executable control software can instruct the signal adjuster to adjust a current level or amplitude of the detection signal to match the desired detection signal level or desired amplitude.

Figure 2:
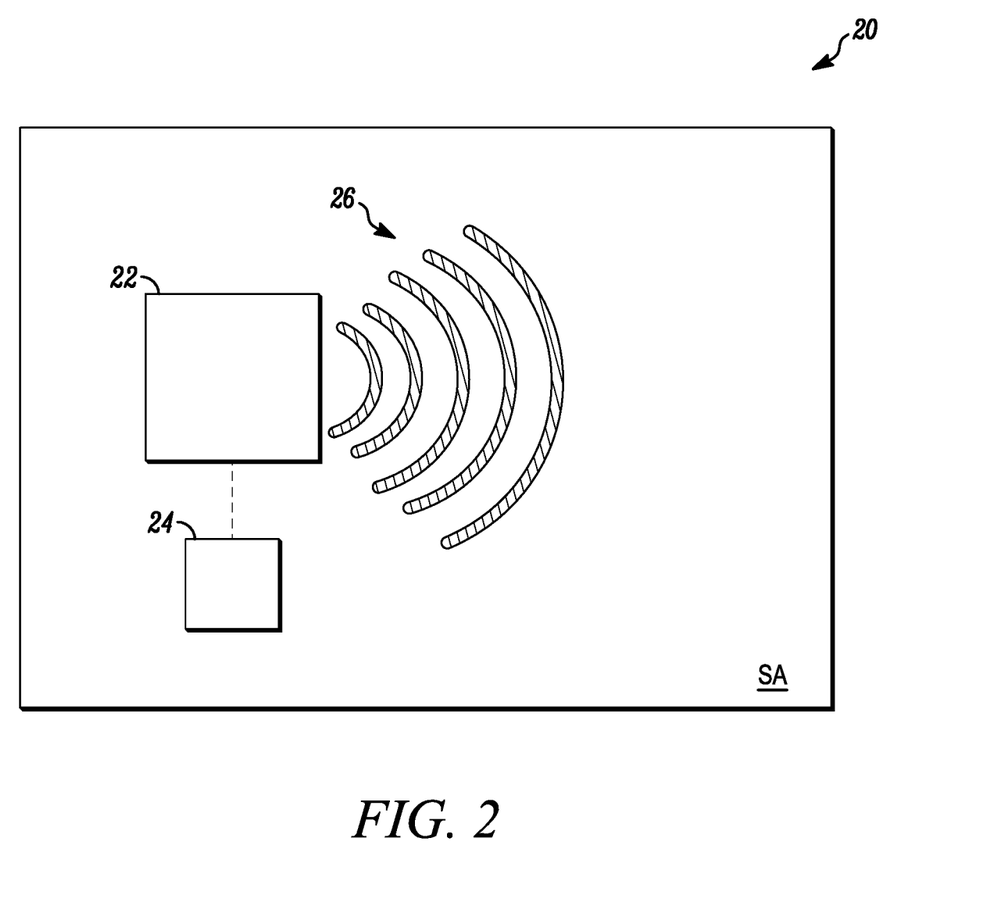
FIG. 2 is a block diagram of a system in accordance with disclosed embodiments.

FIG. 2 is a block diagram of a system 20 in accordance with disclosed embodiments. As seen in FIG. 2, the system 20 can include an intrusion detector 22 and a remote device 24 that communicates with the intrusion detector 24 via a wired or wireless medium. The intrusion detector 22 can generate a detection signal 26 and broadcast the detection signal 26 into a secured area SA so that the detection signal 26 has a broadcast pattern.

Figure 3:
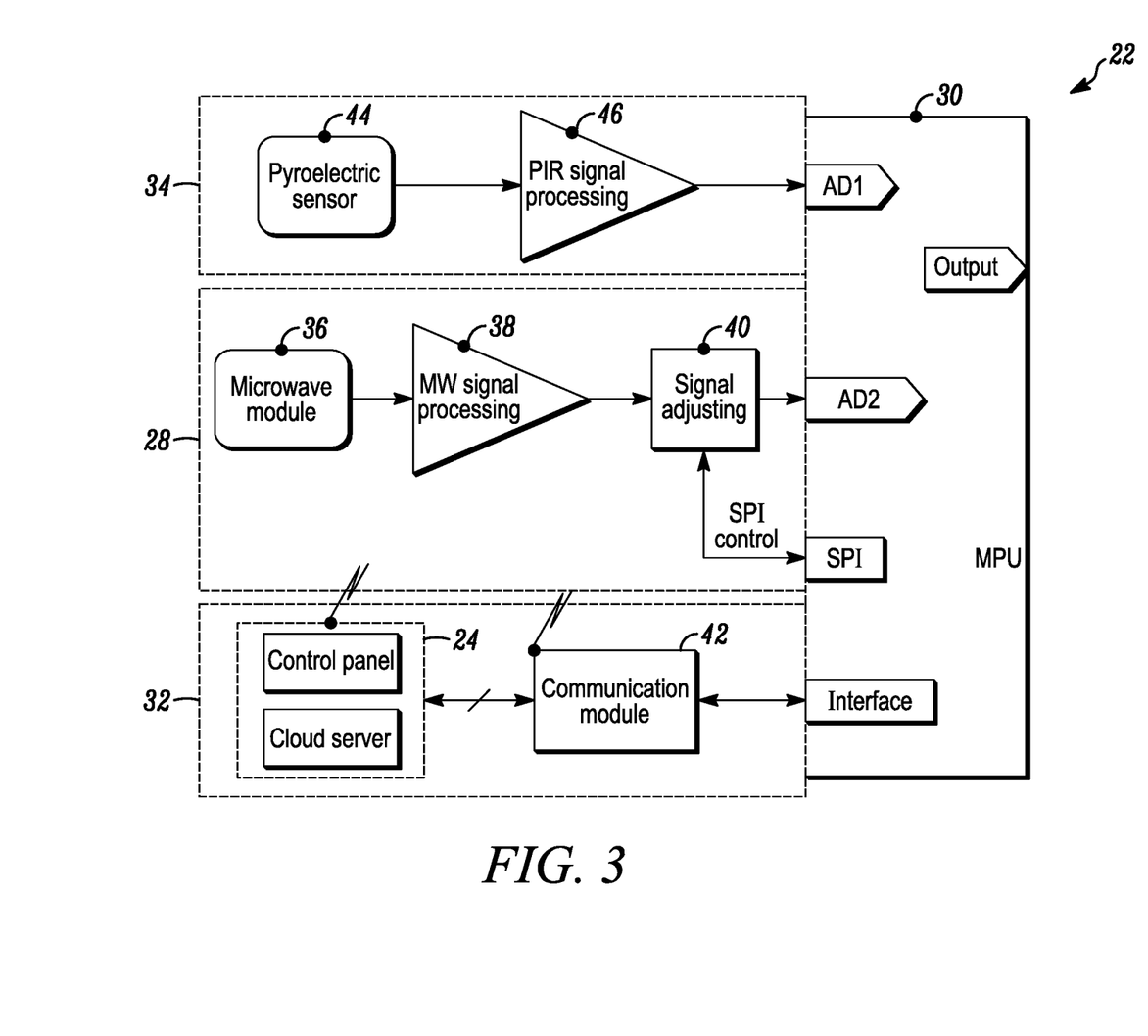
FIG. 3 is a block diagram of an intrusion detector in accordance with disclosed embodiments.
Figure 4:
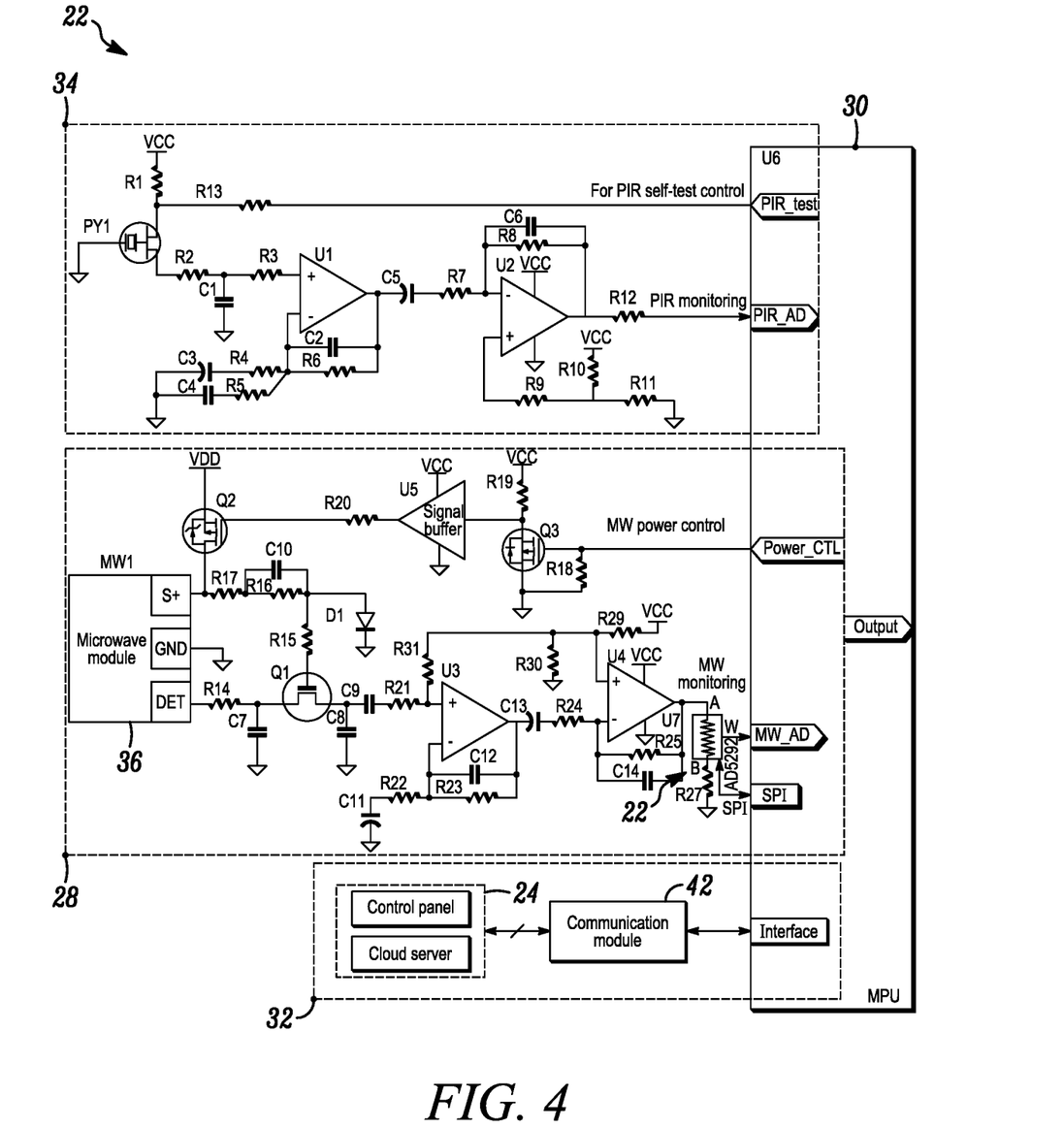
FIG. 4 is a block diagram of an intrusion detector in accordance with disclosed embodiments.

FIG. 3 and FIG. 4 are block diagrams of the intrusion detector 22 in accordance with disclosed embodiments. As seen in FIG. 3 and FIG. 4, the intrusion detector 22 can include an intrusion sensing subsystem 28, a processor 30, a communication subsystem 32, and a pyroelectric sensor subsystem 34. As seen in FIG. 3, the intrusion sensing subsystem 28 can include a microwave sensor module 36, a microwave signal processing module 38 that processes an output of the microwave sensor module 36, and a signal adjuster 40 that adjusts a sensitivity of the microwave sensor module 36 by adjusting an amplitude of the detection signal 26 responsive to instructions from the processor 30. In some embodiments, as seen in FIG. 4, the signal adjuster 40 can include a digital potentiometer controlled by the processor 30.

Furthermore, as seen in FIG. 3 and FIG. 4, the communication subsystem 32 can include a communication module 42 that can receive wireless or wired communications from the remote device 24 and pass the wireless or wired communications received from the remote device 24 to the processor 30 for parsing and other decoding. In some embodiments, the communication module 42 also can broadcast wireless or wired communications from the processor 30 to the remote device 24.

As seen in FIG. 3, the pyroelectric sensor subsystem 34 can include a pyroelectric sensor 44 and a pyroelectric sensor signal processing module 46 that processes an output of the pyroelectric sensor 44 and forwards the output of the pyroelectric sensor 44 as processed to the processor 30. For example, the pyroelectric sensor subsystem 34 can complement, verify, or calibrate functions of the microwave sensor module 36 as would be known in the art. In some embodiments, the intrusion detector 22 need not include the pyroelectric sensor subsystem 34.

Figure 5:
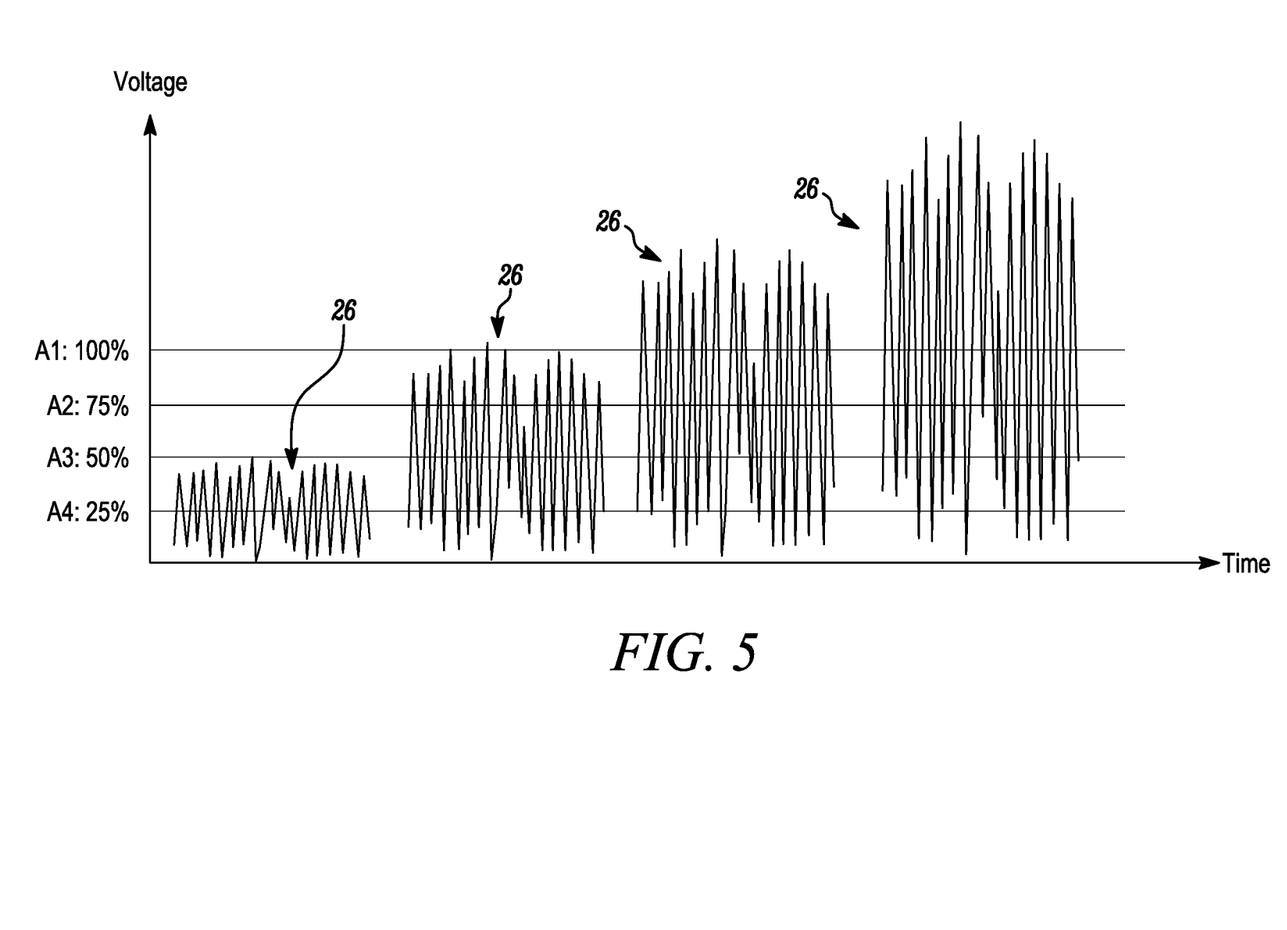
FIG. 5 is a graph of voltage amplitude for a detection signal broadcast by an intrusion detector for a plurality of settings of a signal adjuster of the intrusion detector in accordance with disclosed embodiments.
Figure 6:
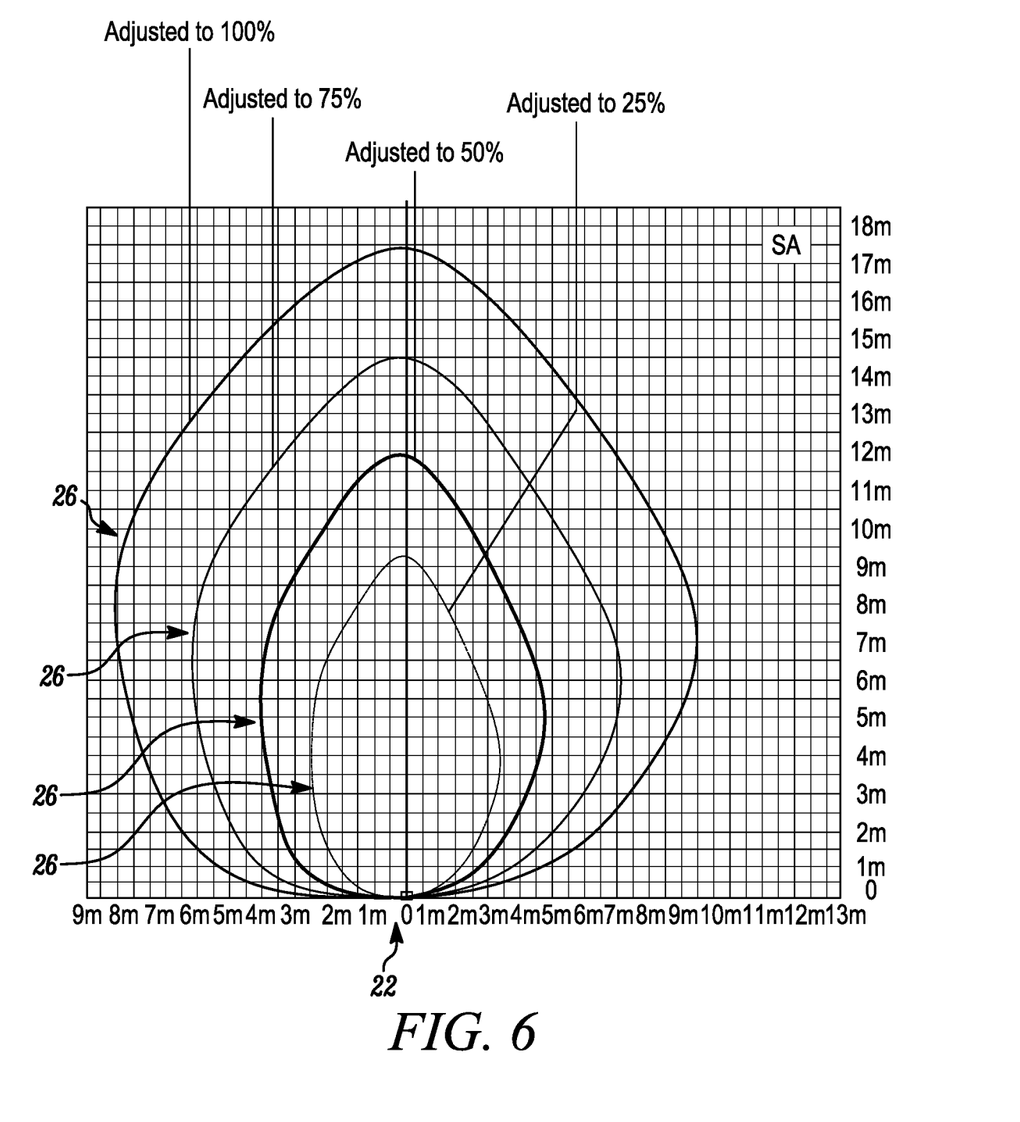
FIG. 6 is a plot of a broadcast pattern of a detection signal broadcast by an intrusion detector for a plurality of settings of a signal adjuster of the intrusion detector in accordance with disclosed embodiments.

FIG. 5 is a graph of voltage amplitude for the detection signal 26 broadcast by the intrusion detector 22 for a plurality of settings of the signal adjuster 40 in accordance with disclosed embodiments, and FIG. 6 is a plot of the broadcast pattern of the detection signal 26 broadcast by the intrusion detector 22 for the plurality of settings of the signal adjuster 40 in accordance with disclosed embodiments. As seen in FIG. 5 and FIG. 6, increasing the voltage amplitude of the detection signal 26 can increase a size of the broadcast pattern of the detection signal 26 and, therefore, an amount of the secured area SA covered by and receiving the detection signal 26. Similarly, decreasing the voltage amplitude of the detection signal 26 can decrease the size of the broadcast pattern of the detection signal 26 and, therefore, the amount of the secured area SA covered by and receiving the detection signal 26.

Figure 7:
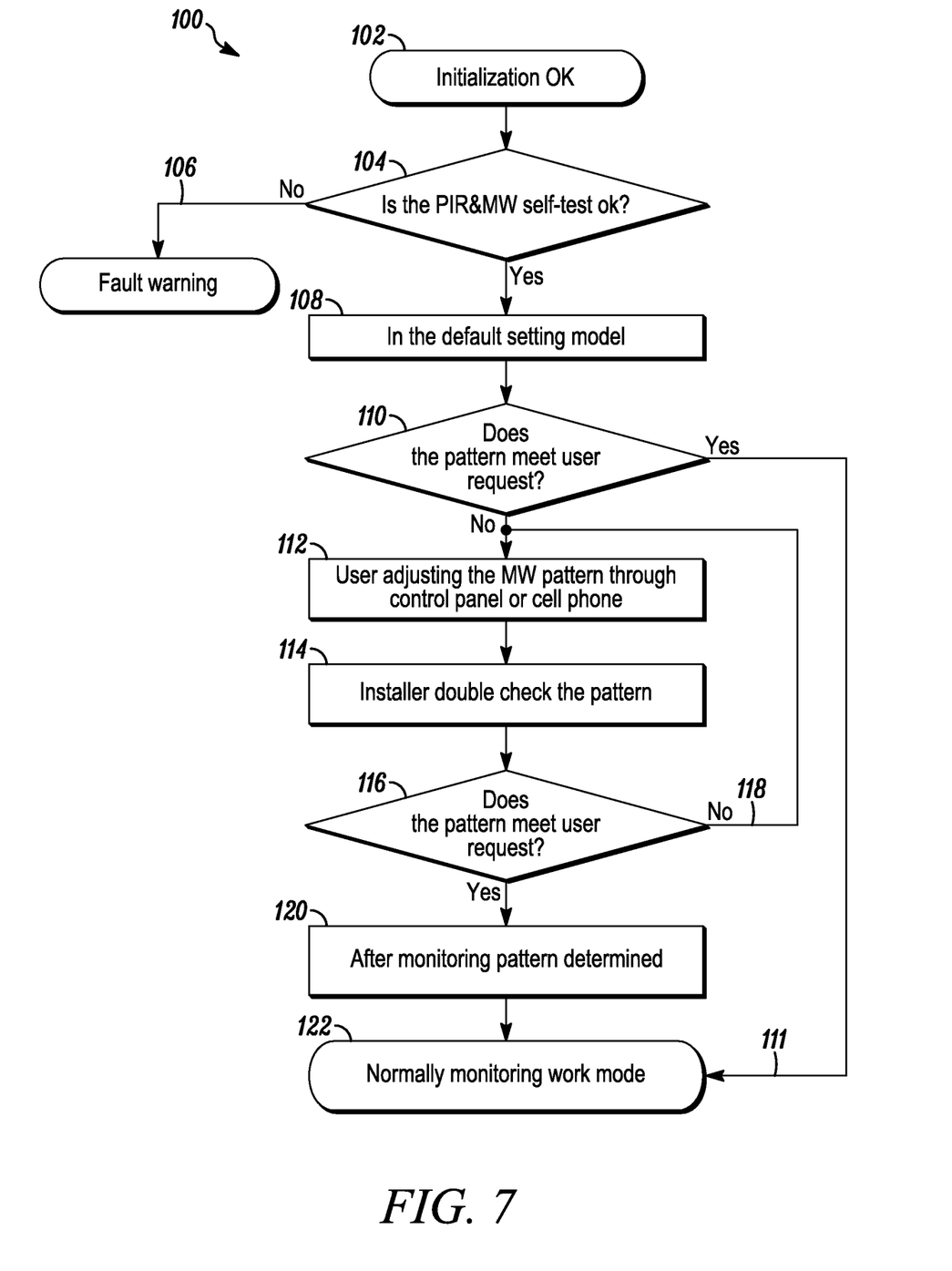
FIG. 7 is a flow diagram of a method in accordance with disclosed embodiments.

FIG. 7 is a flow diagram of a method 100 in accordance with disclosed embodiments. As seen in FIG. 7, the method 100 can include the processor 30 verifying an initialization of the intrusion detector 22, as in 102, and determining whether the microwave sensor module 36 and/or the pyroelectric sensor 44 have passed a self-test, as in 104. When the microwave sensor module 36 and/or the pyroelectric sensor 44 have failed to pass the self-test, the method 100 can include the processor 30 issuing a fault warning via the communication module 42, as in 106. However, when the microwave sensor module 36 and/or the pyroelectric sensor 44 have passed the self-test, the method 100 can include the processor 30 entering a settings configuration mode, as in 108.

Once in the settings configuration mode, the method 100 can include determining whether the broadcast pattern of the broadcast signal 26 being broadcast by the intrusion detector 22 matches a desired pattern for the broadcast signal 26 indicated in received user input, as in 110. When the broadcast pattern of the broadcast signal 26 matches the desired pattern for the broadcast signal 26 to an acceptable degree, the method 100 can include the processor 30 transitioning the intrusion detector 22 into a normal operating mode, as in 111. However, when the broadcast pattern of the broadcast signal 26 fails to match the desired pattern for the broadcast signal 26, the method 100 can include the processor 30 receiving, for example, from the remote device 24, an adjustment signal command with instructions to adjust the broadcast pattern of the detection signal 26, as in 112, and the processor 30 verifying that the broadcast pattern of the detection signal 26 conforms to the instructions in the adjustment signal command, as in 114 and 116.

When the broadcast pattern of the detection signal 26 fails to conform to the instructions in the adjustment signal command, the method 100 can include the processor 30 continuing to receive, for example, from the remote device 24, the adjustment signal command, as in 118. However, when the broadcast pattern of the detection signal 26 does conform with the instructions in the adjustment signal command, the method 100 can include the processor 30 finalizing the broadcast pattern of the detection signal 26, as in 120, and the processor 30 transitioning the intrusion detector 22 into the normal operating mode, as in 122.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A detector comprising:
   a microwave sensor that broadcasts a detection signal into a secured area in a broadcast pattern;
   a signal adjuster electrically coupled to the microwave sensor;
   a communication module that wirelessly receives a signal adjustment command; and
   a processor and executable control software that parse the signal adjustment command and, responsive thereto, instruct the signal adjuster to adjust an amplitude of the detection signal to alter a broadcast area of the broadcast pattern based on information contained in the adjustment command,
   wherein the processor and the executable control software transition the detector into a settings configuration mode, wherein, in the settings configuration mode, the processor and executable control software determine whether the broadcast pattern matches a desired broadcast pattern indicated in the signal adjustment command to an acceptable degree.

2. The detector of claim 1 wherein the information contained in the adjustment command includes a desired area for the broadcast pattern, and wherein the processor and the executable control software instruct the signal adjuster to adjust the amplitude of the detection signal to a value that causes the broadcast area of the broadcast pattern to match the desired area for the broadcast pattern.

3. The detector of claim 1 wherein the information contained in the adjustment command includes a desired detection amplitude, and wherein the processor and the executable control software instruct the signal adjuster to adjust a current amplitude of the detection signal to the desired amplitude.

4. The detector of claim 1 wherein the signal adjuster increases the amplitude of the detection signal to increase the broadcast area of the broadcast pattern and decreases the amplitude of the detection signal to decrease the broadcast area of the broadcast pattern.

5. The detector of claim 1 wherein the signal adjuster includes a digital potentiometer.

6. The detector of claim 1
wherein, after the signal adjuster adjusts the amplitude of the detection signal to alter the broadcast area of the broadcast pattern, the communication module receives an acknowledgement signal, and wherein, responsive to the acknowledgement signal, the processor and the executable control software transition from the settings configuration mode to a normal operating mode.

7. The device of claim 1, wherein, when the processor and executable control software determine that the broadcast pattern matches the desired broadcast pattern indicated in the signal adjustment command to the acceptable degree, the processor and executable control software transition the detector from the settings configuration mode to a normal operating mode.

8. A method comprising:
broadcasting from a microwave sensor of a detector a detection signal into a secured area in a broadcast pattern;
wirelessly receiving at a communication module of the detector a signal adjustment command from a remote device;
parsing the signal adjustment command and instructing a signal adjuster of the detector to adjust an amplitude of the detection signal to alter a broadcast area of the broadcast pattern based on information contained in the adjustment command; and
transitioning the detector into a settings configuration mode, wherein, in the settings configuration mode, determining whether the broadcast pattern matches a desired broadcast pattern indicated in the signal adjustment command to an acceptable degree.

9. The method of claim 8 wherein the information contained in the adjustment command includes a desired area for the broadcast pattern, and wherein a processor and executable control software instruct the signal adjuster to adjust the amplitude of the detection signal to a value that causes the broadcast area of the broadcast pattern to match the desired area for the broadcast pattern.

10. The method of claim 8 wherein the information contained in the adjustment command includes a desired amplitude, and wherein a processor and executable control software instruct the signal adjuster to adjust a current amplitude of the detection signal to the desired amplitude.

11. The method of claim 8 further comprising the signal adjuster increasing the amplitude of the detection signal to increase the broadcast area of the broadcast pattern and decreasing the amplitude of the detection signal to decrease the broadcast area of the broadcast pattern.

12. The method of claim 8 wherein the signal adjuster includes a digital potentiometer.

13. The method of claim 8 further comprising:
after the signal adjuster adjusts the amplitude of the detection signal to alter the broadcast area of the broadcast pattern, the communication module receiving, from the remote device, an acknowledgement signal; and
responsive to receiving the acknowledgement signal, a processor and executable control software transitioning the detector from the settings configuration mode to a normal operating mode.

14. The method of claim 8 wherein the remote device includes one of a control panel of a security system or a mobile device.

15. A system comprising:
a remote device; and
an intrusion detector including a microwave sensor, a signal adjuster electrically coupled to the microwave sensor, a communication module, a processor, and executable control software,
wherein the microwave sensor broadcasts a detection signal into a secured area in a broadcast pattern,
wherein the communication module wirelessly receives a signal adjustment command from the remote device,
wherein the processor and the executable control software parse the signal adjustment command and instruct the signal adjuster to adjust an amplitude of the detection signal to alter a broadcast area of the broadcast pattern based on information contained in the adjustment command, and
wherein the processor and the executable control software transition the detector into a settings configuration mode, wherein, in the settings configuration mode, the processor and executable control software determine whether the broadcast pattern matches a desired broadcast pattern indicated in the signal adjustment command to an acceptable degree.

16. The system of claim 15 wherein the information contained in the adjustment command includes a desired area for the broadcast pattern, and
wherein the processor and the executable control software instruct the signal adjuster to adjust the amplitude of the detection signal to a value that causes the broadcast area of the broadcast pattern to match the desired area for the broadcast pattern.

17. The system of claim 15 wherein the information contained in the adjustment command includes a desired amplitude of the broadcast signal, and
wherein the processor and the executable control software instruct the signal adjuster to adjust a current amplitude of the detection signal to the desired amplitude.

18. The system of claim 15 wherein the signal adjuster increases the amplitude of the detection signal to increase the broadcast area of the broadcast pattern and decreases the amplitude of the detection signal to decrease the broadcast area of the broadcast pattern.

19. The system of claim 15 wherein, after the signal adjuster adjusts the amplitude of the detection signal to alter the broadcast area of the broadcast pattern, the communication module receives an acknowledgement signal, and wherein, responsive to the acknowledgement signal, the processor and the executable control software transition the intrusion detector from the settings configuration mode to a normal operating mode.

20. The system of claim 15 wherein the remote device includes one of a control panel of a security system or a mobile device.

* * * * *